United States Patent
Elie et al.

(10) Patent No.: US 12,548,824 B2
(45) Date of Patent: Feb. 10, 2026

(54) VACUUM INSULATED THERMAL BARRIER STRUCTURES FOR TRACTION BATTERY PACKS

(71) Applicant: FORD GLOBAL TECHNOLOGIES, LLC, Dearborn, MI (US)

(72) Inventors: Larry Dean Elie, Ypsilanti, MI (US); Mark Meinhart, Dexter, MI (US); Jeremy Santiago, Ann Arbor, MI (US); Richard Werth, Milan, MI (US); John Cornell, Allenton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 487 days.

(21) Appl. No.: 18/052,021

(22) Filed: Nov. 2, 2022

(65) Prior Publication Data
US 2024/0145820 A1  May 2, 2024

(51) Int. Cl.
- *H01M 10/658* (2014.01)
- *H01M 10/625* (2014.01)
- *H01M 10/6556* (2014.01)

(52) U.S. Cl.
CPC ....... *H01M 10/658* (2015.04); *H01M 10/625* (2015.04); *H01M 10/6556* (2015.04); *H01M 2220/20* (2013.01)

(58) Field of Classification Search
CPC ............. H01M 10/568; H01M 10/625; H01M 10/6556
USPC ......................................................... 429/120
See application file for complete search history.

(56) References Cited

U.S. PATENT DOCUMENTS

| | | | |
|---|---|---|---|
| 5,460,900 A * | 10/1995 | Rao | H01M 50/114 429/72 |
| 9,515,357 B2 | 12/2016 | Haskins et al. | |
| 10,461,383 B2 | 10/2019 | Haag et al. | |
| 10,777,793 B2 | 9/2020 | Brinkmann et al. | |
| 11,165,111 B2 | 11/2021 | Chopard et al. | |
| 2009/0031659 A1 | 2/2009 | Kalfon | |

(Continued)

FOREIGN PATENT DOCUMENTS

| | | | |
|---|---|---|---|
| CN | 216161818 U | 4/2022 | |
| RU | 2722439 C1 * | 6/2020 | ............ H01M 10/42 |
| WO | 2021177585 A1 | 9/2021 | |

OTHER PUBLICATIONS

RU2722439 machine translation (Year: 2020).*

*Primary Examiner* — Jonathan G Leong
*Assistant Examiner* — John S Medley
(74) *Attorney, Agent, or Firm* — David B. Kelley; Carlson, Gaskey & Olds, P.C.

(57) ABSTRACT

Exemplary traction battery pack designs are described for use in electrified vehicles. An exemplary traction battery pack may include one or more thermal barrier structures. In some implementations, each thermal barrier structure may include both a heat exchanger portion for stabilizing a temperature of battery cells of the traction battery pack and a vacuum portion for isolating the battery cells and/or the heat exchanger portion from ambient conditions. In other implementations, the thermal barrier structure may include only the vacuum portion. The thermal barrier structure may be arranged to interface with a battery array of the traction battery pack and could be integrated as part of an enclosure assembly of the traction battery pack.

16 Claims, 5 Drawing Sheets

(56) References Cited

U.S. PATENT DOCUMENTS

| | | | |
|---|---|---|---|
| 2012/0244393 A1* | 9/2012 | Stanek | H01M 10/613 |
| | | | 429/50 |
| 2015/0155530 A1* | 6/2015 | Takahashi | H01M 50/121 |
| | | | 429/127 |
| 2016/0049706 A1* | 2/2016 | Kerspe | H01M 10/6555 |
| | | | 429/120 |
| 2017/0214010 A1* | 7/2017 | Kerspe | H01M 10/655 |
| 2020/0220128 A1* | 7/2020 | Kim | H01M 10/6551 |
| 2021/0320344 A1* | 10/2021 | Chopard | F28D 20/02 |

\* cited by examiner

VACUUM INSULATED THERMAL BARRIER STRUCTURES FOR TRACTION BATTERY PACKS

TECHNICAL FIELD

This disclosure relates generally to electrified vehicle traction battery packs, and more particularly to vacuum insulated thermal barrier structures for use within traction battery packs.

BACKGROUND

A high voltage traction battery pack typically powers an electric machine and other electrical loads of an electrified vehicle. The traction battery pack includes a plurality of battery cells and various other battery internal components that are housed inside an outer enclosure assembly for supporting the electric propulsion of the electrified vehicle. Battery cell performance during charging and discharging conditions can be influenced by temperatures in and surrounding the traction battery pack.

SUMMARY

A traction battery pack according to an exemplary aspect of the present disclosure includes, among other things, a battery array and a thermal barrier structure positioned proximate to at least one side of the battery array. The thermal barrier structure includes a heat exchanger portion that establishes an internal cooling circuit of the thermal barrier structure, and a vacuum portion that establishes a sealed cavity of the thermal barrier structure.

In a further non-limiting embodiment of the foregoing traction battery pack, the sealed cavity is evacuated of air.

In a further non-limiting embodiment of either of the foregoing traction battery packs, the thermal barrier structure includes an interior wall that faces toward the battery array, an exterior wall that faces away from the battery array, and an internal wall disposed inside the thermal barrier structure at a location between the interior wall and the exterior wall.

In a further non-limiting embodiment of any of the foregoing traction battery packs, the internal cooling circuit extends between the interior wall and the internal wall, and the sealed cavity extends between the internal wall and the exterior wall.

In a further non-limiting embodiment of any of the foregoing traction battery packs, the internal cooling circuit includes a plurality of fluid channels that are at least partially separated from one another by a plurality of walls.

In a further non-limiting embodiment of any of the foregoing traction battery packs, the vacuum portion includes a column that extends across the sealed cavity between the internal wall and the exterior wall.

In a further non-limiting embodiment of any of the foregoing traction battery packs, the vacuum portion includes a first dome-shaped panel and a second dome-shaped panel.

In a further non-limiting embodiment of any of the foregoing traction battery packs, a column extends from the first dome-shaped panel to the second dome-shaped panel.

In a further non-limiting embodiment of any of the foregoing traction battery packs, the vacuum portion includes a vacuum port.

In a further non-limiting embodiment of any of the foregoing traction battery packs, the vacuum port includes a getter.

In a further non-limiting embodiment of any of the foregoing traction battery packs, a second thermal barrier structure is positioned proximate to at least one second side of the battery array.

In a further non-limiting embodiment of any of the foregoing traction battery packs, the thermal barrier structure is integrally formed with at least one additional thermal barrier structure to establish a thermal barrier structure assembly.

A traction battery pack according to another exemplary aspect of the present disclosure includes, among other things, a battery array and an enclosure assembly including a thermal barrier structure that is arranged to interface with the battery array. The thermal barrier structure includes an interior wall that faces toward an interior of the enclosure assembly, an exterior wall that faces toward an exterior environment, and a sealed cavity disposed between the interior wall and the exterior wall.

In a further non-limiting embodiment of the foregoing traction battery pack, the thermal barrier structure establishes an enclosure cover of the enclosure assembly.

In a further non-limiting embodiment of either of the foregoing traction battery packs, at least one column extends between the interior wall and the exterior wall.

In a further non-limiting embodiment of any of the foregoing traction battery packs, the sealed cavity is evacuated of air.

In a further non-limiting embodiment of any of the foregoing traction battery packs, the interior wall and the exterior wall each include a dome-shaped surface.

In a further non-limiting embodiment of any of the foregoing traction battery packs, the thermal barrier structure includes a vacuum port.

In a further non-limiting embodiment of any of the foregoing traction battery packs, the vacuum port includes a getter.

In a further non-limiting embodiment of any of the foregoing traction battery packs, the vacuum port is provided on a dome-shaped surface of either the interior wall or the exterior wall.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include one or more thermal barrier structures. In some implementations, each thermal barrier structure may include both a heat exchanger portion for stabilizing a temperature of battery cells of the traction battery pack and a vacuum portion for isolating the battery cells and/or the heat exchanger portion from ambient conditions. In other implementations, the thermal barrier structure may include only the vacuum portion. The thermal barrier structure may be arranged to interface with a battery array of the traction battery pack and could be integrated as part of an enclosure assembly of the traction battery pack. These and other features are discussed in greater detail in the following paragraphs of this detailed description.

Figure 1:
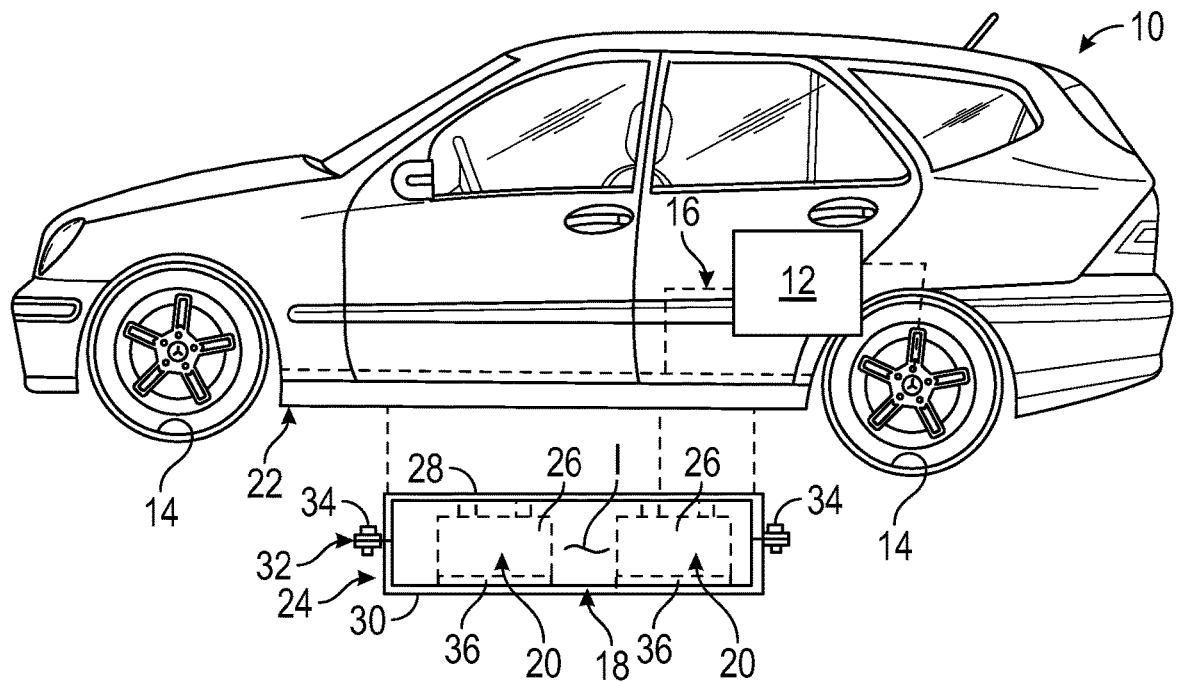
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells 26) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 26 may be stacked side-by-side along a stack axis to construct a grouping of battery cells 26, sometimes referred to as a "cell stack." In the highly schematic depiction of FIG. 1, the battery cells 26 are stacked in a direction into the page to construct each battery array 20, and thus the battery arrays 20 extend in cross-car direction. However, other configurations may also be possible.

The total number of battery arrays 20 and battery cells 26 provided within the traction battery pack 18 is not intended to limit this disclosure. In an embodiment, the battery cells 26 of each battery array 20 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The traction battery pack 18 may be secured to an underbody 22 of the electrified vehicle 10. However, the traction battery pack 18 could be located elsewhere on the electrified vehicle 10 within the scope of this disclosure.

An outer enclosure assembly 24 may house each battery array 20 of the traction battery pack 18. The outer enclosure assembly 24 may be a sealed enclosure and may embody any size, shape, and configuration within the scope of this disclosure. In an embodiment, the outer enclosure assembly 24 includes an enclosure cover 28 and an enclosure tray 30. Together, the enclosure cover 28 and the enclosure tray 30 may establish an interior I for housing the battery arrays 20 and other battery internal components (e.g., bussed electrical center, battery electric control module, wiring, connectors, etc.) of the traction battery pack 18.

During assembly of the traction battery pack 18, the enclosure cover 28 may be secured to the enclosure tray 30 at an interface 32 therebetween. The interface 32 may substantially circumscribe the interior I. In some implementations, mechanical fasteners 34 may be used to secure the enclosure cover 28 to the enclosure tray 30, although other fastening methodologies (adhesion, etc.) could also be suitable for this purpose.

Figure 2:
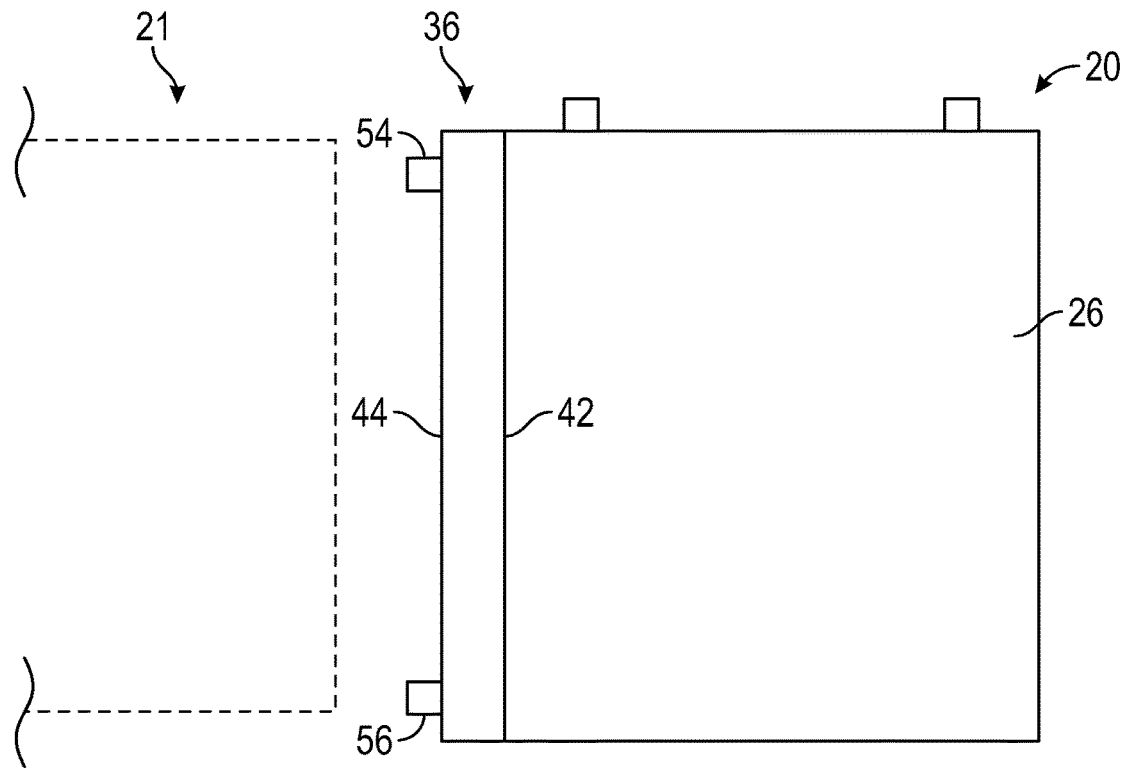
FIG. 2 illustrates a thermal barrier structure positioned proximate a battery array of a traction battery pack.
Figure 3:
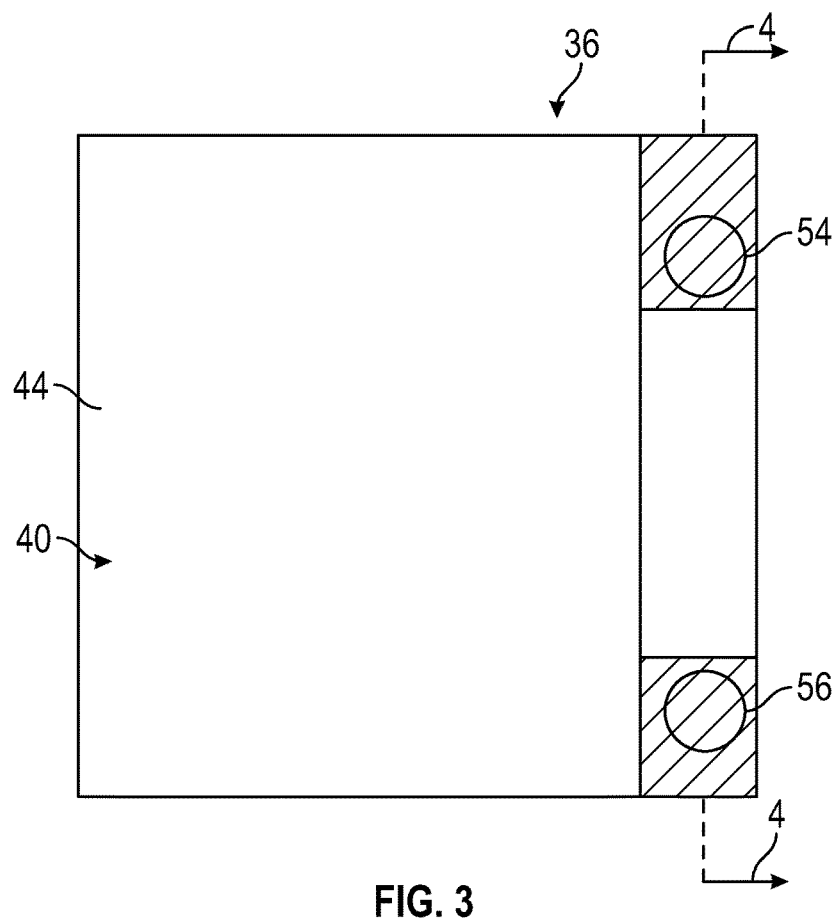
FIG. 3 is a side view of the thermal barrier structure of FIG. 2.
Figure 4:
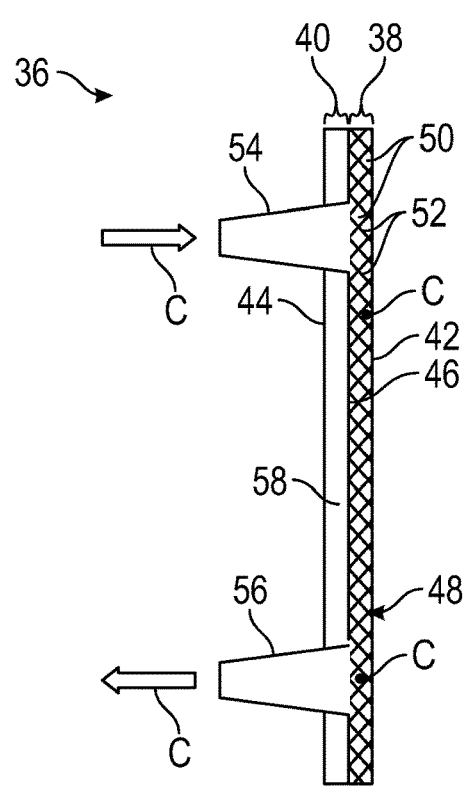
FIG. 4 is a cross-sectional view through section 4-4 of FIG. 3.

FIGS. 2, 3, and 4 illustrate an exemplary thermal barrier structure 36 that can be incorporated within a traction battery pack, such as the traction battery pack 18 of FIG. 1, for example. The thermal barrier structure 36 may be positioned proximate at least one side of a battery array 20 of the traction battery pack 18. In an embodiment, the thermal barrier structure 36 is positioned axially between the battery array 20 and some other component 21 (e.g., an additional battery array or a component exposed to ambient surroundings) of the traction battery pack 18.

The thermal barrier structure 36 may be a multi-layered, sheet-like component that includes a heat exchanger portion 38 and a vacuum portion 40. The heat exchanger portion 38 and the vacuum portion 40 may be integrally formed together to establish a unitary, single-piece body of the thermal barrier structure 36. In an embodiment, the thermal barrier structure 36 may be an additively manufactured (e.g., 3D printed) part. However, other manufacturing techniques are also contemplated within the scope of this disclosure.

The thermal barrier structure 36 may be constructed from a metallic material, such as aluminum, for example. However, other materials, including but not limited to stainless steel and copper, are additionally contemplated within the scope of this disclosure.

The thermal barrier structure 36 may include an interior wall 42, an exterior wall 44, and an internal wall 46. The interior wall 42 faces toward the battery array 20 and thus establishes an interfacing surface between the battery array 20 and the thermal barrier structure 36. The exterior wall 44 faces in a direction away from the battery array 20. The exterior wall 44 may therefore face toward another battery array or some other structure of the traction battery pack 18 or could even be exposed to an exterior environment surrounding the traction battery pack 18. The internal wall 46 may be enclosed inside of the thermal barrier structure 36 at a location between the interior wall 42 and the exterior wall 44.

As best shown in FIG. 4, the internal wall 46 may divide the interior of the thermal barrier structure 36 into the heat exchanger portion 38 and the vacuum portion 40. The heat exchanger portion 38 may extend between the interior wall 42 and the internal wall 46 and is thus located closer to the battery array 20 as compared to the vacuum portion 40. The vacuum portion 40 may extend between the internal wall 46 and the exterior wall 44 and is thus located further from the battery array 20 as compared to the heat exchanger portion 38 when the thermal barrier structure is disposed proximate the battery array 20.

The heat exchanger portion 38 of the thermal barrier structure 36 may be configured for thermally managing the battery array 20. For example, heat may be generated and released by the battery cells 26 of the battery array 20 during charging operations, discharging operations, extreme ambient conditions, etc. It is often desirable to actively remove the heat from the battery array 20 to enhance the capacity and life of the battery cells 26. The heat exchanger portion 38 may thus be configured to conduct the heat out of the battery cells 26. In other words, the heat exchanger portion 38 may function as a heat sync to remove heat from the heat sources (i.e., the battery cells 26). The heat exchanger portion 38 can alternatively be employed to heat the battery cells 26 of the battery array 20, such as during relatively cold ambient conditions.

In an embodiment, an internal cooling circuit 48 may be provided within the heat exchanger portion 38 for performing the heat transfer functions described in the preceding paragraph. A coolant C may be selectively circulated through the internal cooling circuit 48 to thermally condition the battery cells 26 of the battery array 20. In an embodiment, the coolant C is a conventional type of coolant mixture such as water mixed with ethylene glycol. However, other coolants, including gases, are also contemplated within the scope of this disclosure.

In an embodiment, the internal cooling circuit 48 is established by a lattice structure that includes a plurality of fluid channels 50 separated by walls 52 that extend inside the heat exchanger portion 38 of the thermal barrier structure 36. The fluid channels 50 may be hexagonal shaped and may be fluidly connected to one another for communicating the coolant C through the internal cooling circuit 48. The size, shape, and total number of fluid channels 50 are not intended to limit this disclosure and could be specifically tuned to the cooling requirements of the battery array 20/traction battery pack 18.

In use, the coolant C may be communicated into an inlet 54 of the internal cooling circuit 48 and may then be communicated through the fluid channels 50 before exiting through an outlet 56 of the internal cooling circuit 48. The coolant C may pick up heat conducted through the interior wall 42 from the battery array 20 as it meanders along its serpentine path, thereby carrying away excessive heat and stabilizing the temperature of the battery cells 26. Although not shown, the coolant C exiting the outlet 56 may be delivered to a radiator or some other heat exchanging device, be cooled, and then returned to the inlet 54 in a closed loop.

In an embodiment, the internal wall 46 of the thermal barrier structure 36 establishes a floor of the internal cooling circuit 48. The internal wall 46 therefore aids in guiding the coolant C as it circulates through the internal cooling circuit 48.

The vacuum portion 40 of the thermal barrier structure 36 may be configured for insulating the heat exchanger portion 38 and the battery array 20 from the exterior environment surrounding the thermal barrier structure 36. A sealed cavity 58 may be provided within the vacuum portion 40 for providing the insulating features. The sealed cavity 58 may extend between the internal wall 46 and the exterior wall 44.

By providing the insulating features, the sealed cavity 58 is adapted to limit the thermal transfer of energy from the exterior environment into the internal cooling circuit 48 of the heat exchanger portion 38. In an embodiment, the sealed cavity 58 is completely evacuated of air and therefore acts as an insulator so that less heat (or less cooling effect) from the exterior environment is introduced into the internal cooling circuit 48. In other words, the sealed cavity 58 may be configured to reduce the thermal path between the vacuum portion 40 and the heat exchanger portion 38, thereby improving thermal efficiencies.

By virtue of the applied internal vacuum, the sealed cavity 58 may further limit the communication of mechanical sounds across the thermal barrier structure 36. The design characteristics of the sealed cavity 58 may be tuned to control the frequency of sounds allowed to pass through the thermal barrier structure 36.

Figure 5:
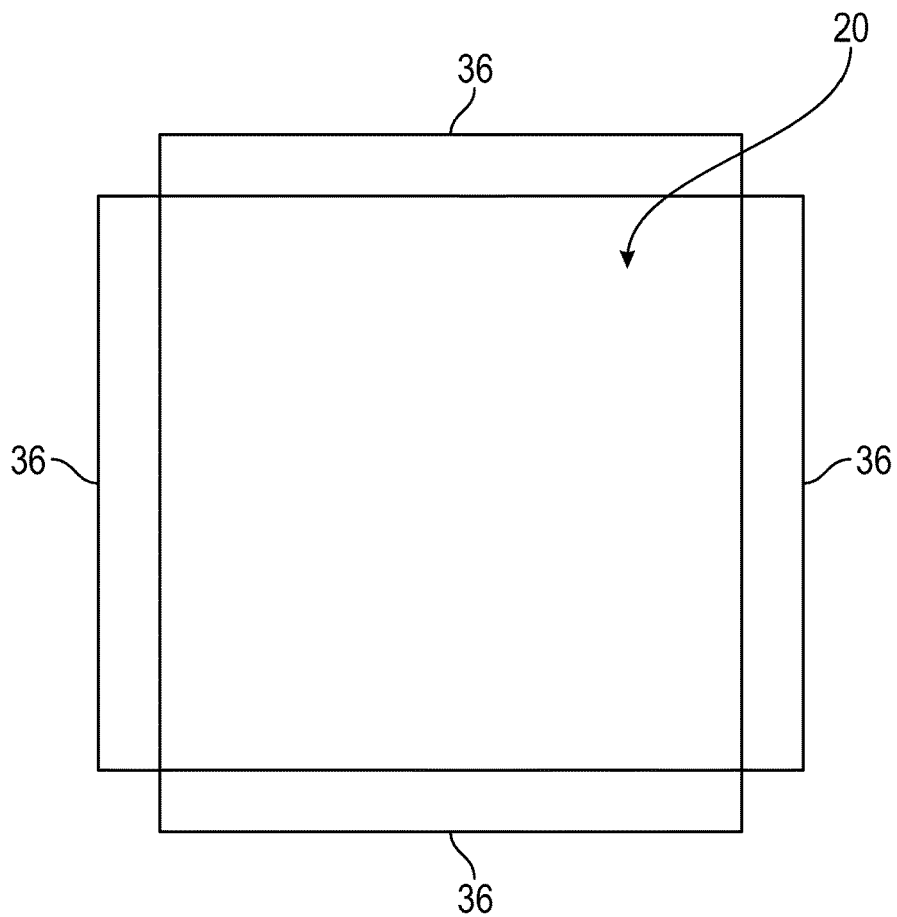
FIG. 5 illustrates multiple thermal barrier structures positioned about a battery array.

Although only one thermal barrier structure 36 is depicted in FIGS. 2-4, multiple thermal barrier structures 36 could be arranged to substantially surround the battery array 20 in order to better insulate the battery array 20 and dissipate heat generated within the battery cells 26 of the battery array 20 (see, e.g., FIG. 5).

Figure 6:
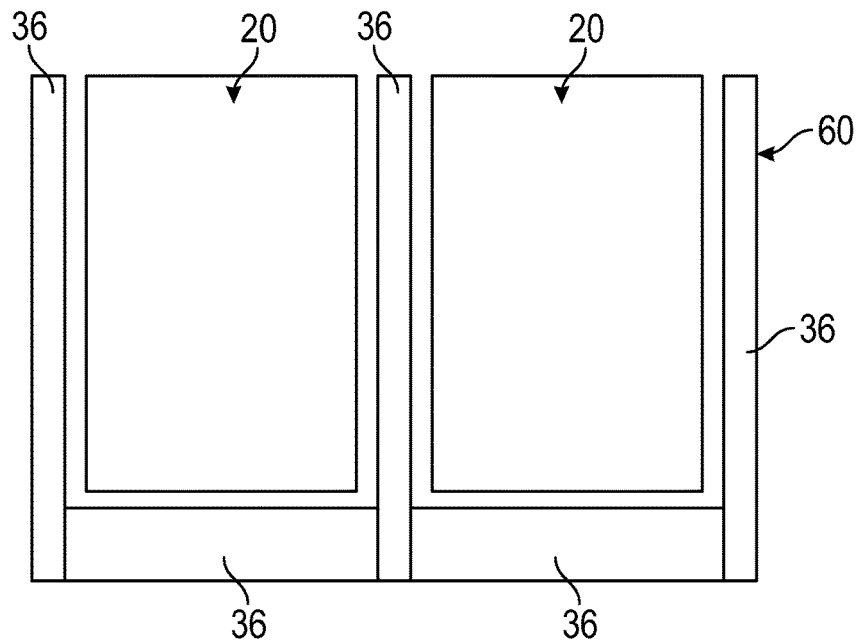
FIG. 6 illustrates a thermal barrier structure assembly positioned relative to adjacent battery arrays.

In yet another embodiment, shown in FIG. 6, multiple thermal barrier structures 36 may be formed or attached together to provide a thermal barrier structure assembly 60. The thermal barrier structure assembly 60 may be configured to surround multiple sides of multiple battery arrays 20 and to further establish a thermal barrier between adjacent battery arrays 20.

Figure 7:
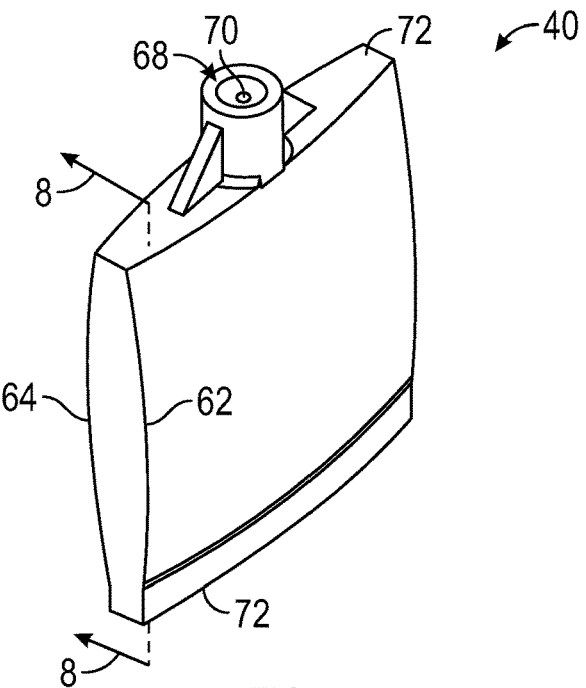
FIG. 7 illustrates a vacuum portion of a thermal barrier structure.
Figure 8:
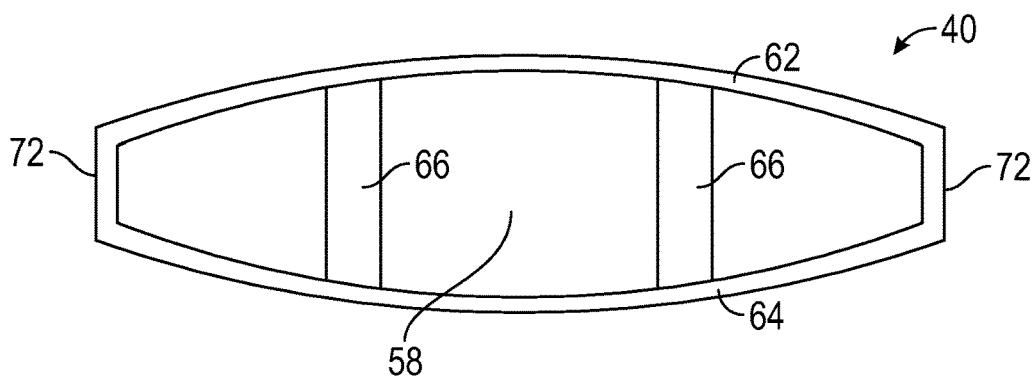
FIG. 8 is a cross-sectional view through section 8-8 of FIG. 7.

FIGS. 7 and 8 illustrates an exemplary design of the vacuum portion 40 of the thermal barrier structure 36. The vacuum portion 40 may include a first dome-shaped panel 62 and a second dome-shaped panel 64. When joined with the heat exchanger portion 38, the first dome-shaped panel 62 may establish the exterior wall 44 of the thermal barrier structure 36 and the second dome-shaped panel 64 may establish the internal wall 46 of the thermal barrier structure 36. The curvature of the first and second dome-shaped panels 62, 64 may increase the stiffness of the vacuum portion 40 and thus aid in supporting the vacuum when the sealed cavity 58 is evacuated of air.

One or more columns 66 may extend inside the vacuum portion 40. The columns 66 may extend across the sealed cavity 58 and may connect between the first dome-shaped panel 62 and the second dome-shaped panel 64. The columns 66 may structurally reinforce the vacuum portion 40 and prevent the first and second dome-shaped panels 62, 64 from caving in toward one another when the sealed cavity 58 is evacuated of air. A spacing between the columns 66 may be tuned to provide a desired level of stiffness and structural support.

Figure 9:
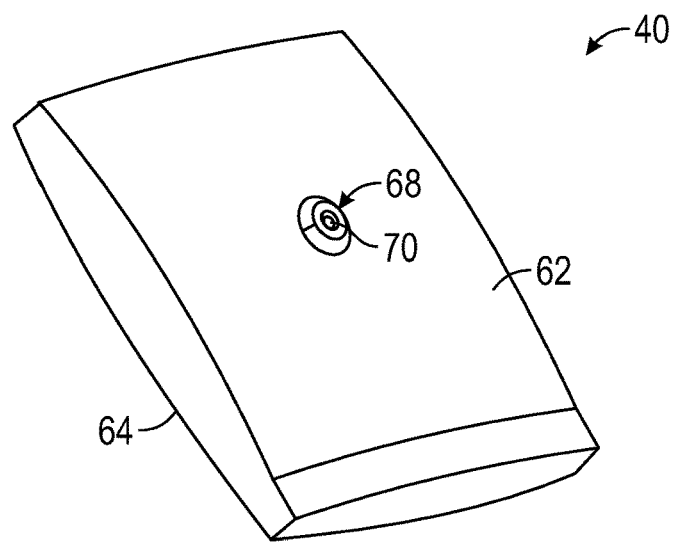
FIG. 9 illustrates another exemplary vacuum portion of a thermal barrier structure.

The vacuum portion 40 may further include one or more vacuum ports 68. The vacuum ports 68 may be configured for applying a vacuum (e.g., via a vacuum pump) in order to evacuate the sealed cavity 58 of air. Each vacuum port 68 may be equipped with a getter 70 for completing and maintaining the vacuum. In an embodiment, the vacuum port 68 is provided one of the walls 72 that connects between the dome-shaped panels 62, 64 (see FIGS. 7-8). In another embodiment, the vacuum port 68 is provided in one of the dome-shaped panels 62, 64 (see FIG. 9).

Figure 10:
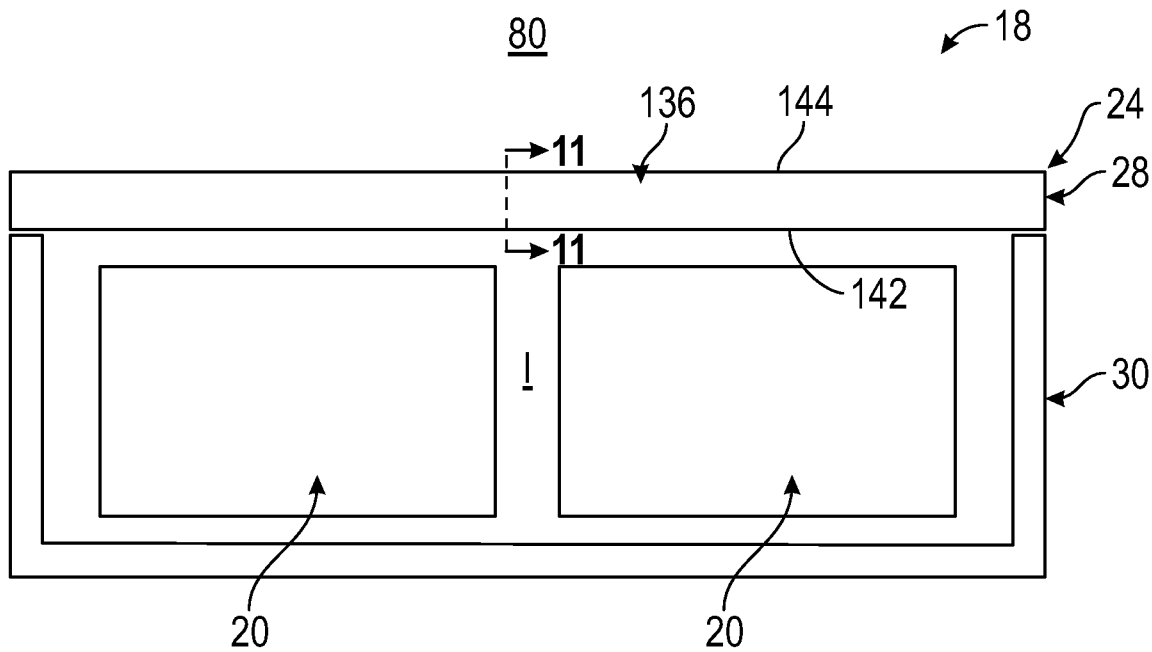
FIG. 10 illustrate another exemplary thermal barrier structure.
Figure 11:
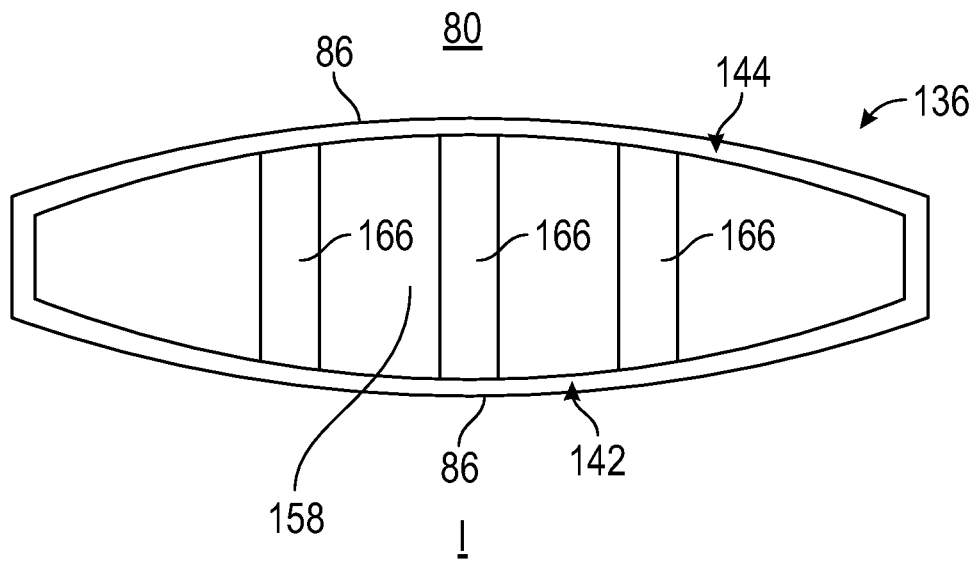
FIG. 11 is a cross-sectional view through section 11-11 of FIG. 10.

FIGS. 10 and 11 illustrate another exemplary thermal barrier structure 136 that can be incorporated within the traction battery pack 18. In this embodiment, the thermal barrier structure 136 establishes the enclosure cover 28 of the enclosure assembly 24 of the traction battery pack 18. However, other configurations are contemplated within the scope of this disclosure. For example, one or more portions of the enclosure tray 30 could alternatively or additionally include the thermal barrier structure 136.

The thermal barrier structure 136 may include an interior wall 142 and an exterior wall 144. The interior wall 142 faces toward the interior I of the enclosure assembly 24 and therefore may interface with one or more battery arrays 20 of the traction battery pack 18. The exterior wall 144 faces toward an exterior environment 80 located outside of the traction battery pack 18. The exterior wall 144 includes an outer surface that is exposed to the exterior environment 80.

A sealed cavity 158 may be provided inside the thermal barrier structure 136 for insulating the battery arrays 20 and other battery internal components from the exterior environment 80. The sealed cavity 158 may extend between the interior wall 142 and the exterior wall 144.

The sealed cavity 158 may be adapted to limit the thermal transfer of energy from the exterior environment 80 to the interior I. For example, the sealed cavity 158 may be completely evacuated of air and therefore acts as an insulator so that less heat (or less cooling effect) from the exterior environment 80 is introduced into the interior I. In other words, the sealed cavity 158 may reduce the thermal path between the exterior environment 80 and the interior I, thereby improving thermal efficiencies.

By virtue of the applied vacuum, the sealed cavity 158 may further limit the communication of mechanical sounds across the thermal barrier structure 136. The design characteristics of the sealed cavity 158 may be tuned to control the frequency of sounds allowed to pass through the thermal barrier structure 136.

The interior wall 142 and the exterior wall 144 may each include a dome-shaped surface 86. The curvature of the dome-shaped surfaces 86 may increase the stiffness of the thermal barrier structure 136 and thus aid in supporting the vacuum when the sealed cavity 158 is evacuated of air.

One or more columns 166 may extend inside the thermal barrier structure 136. The columns 166 may extend across the sealed cavity 158 and may connect between the interior wall 142 and the exterior wall 144. The columns 166 may structurally reinforce the thermal barrier structure 136 and prevent the interior wall 142 and the exterior wall 144 from caving toward one another when the sealed cavity 158 is evacuated of air. A spacing between the columns 166 may be tuned to provide a desired level of stiffness and structural support.

The thermal barrier structure 136 may include one or more vacuum ports for applying the vacuum to the sealed cavity 158. The vacuum ports may be configured in a similar manner to those shown in FIGS. 7 and 9.

The exemplary traction battery packs of this disclosure include multi-layered thermal barrier structures for providing an efficient and complete thermal control system in a relatively thin package. The thermal barrier structures therefore protect the battery internals during both relatively cold and relatively hot ambient conditions, thereby improving battery cell performance and life. The proposed structures may further decrease charge times, increase range, and reduce noise without sacrificing packaging space.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
    a battery array; and
    a thermal barrier structure positioned adjacent to at least one side of the battery array,
    wherein the thermal barrier structure includes a heat exchanger portion that establishes an internal cooling circuit of the thermal barrier structure and a vacuum portion that establishes a sealed cavity of the thermal barrier structure,
    wherein the vacuum portion includes at least one dome-shaped panel.

2. The traction battery pack as recited in claim 1, wherein the sealed cavity is evacuated of air.

3. The traction battery pack as recited in claim 1, wherein the thermal barrier structure includes an interior wall that faces toward the battery array, an exterior wall that faces away from the battery array, and an internal wall disposed inside the thermal barrier structure at a location between the interior wall and the exterior wall.

4. The traction battery pack as recited in claim 3, wherein the internal cooling circuit extends between the interior wall and the internal wall, and the sealed cavity extends between the internal wall and the exterior wall.

5. The traction battery pack as recited in claim 1, wherein the internal cooling circuit includes a plurality of fluid channels that are at least partially separated from one another by a plurality of walls.

6. The traction battery pack as recited in claim 1, wherein the vacuum portion includes a column that extends across the sealed cavity between an internal wall and an exterior wall.

7. The traction battery pack as recited in claim 1, wherein the vacuum portion includes a first dome-shaped panel and a second dome-shaped panel.

8. The traction battery pack as recited in claim 7, comprising a column that extends from the first dome-shaped panel to the second dome-shaped panel.

9. The traction battery pack as recited in claim 1, wherein the vacuum portion includes a vacuum port.

10. The traction battery pack as recited in claim 9, wherein the vacuum port includes a getter.

11. The traction battery pack as recited in claim 1, comprising a second thermal barrier structure positioned adjacent to at least one second side of the battery array.

12. The traction battery pack as recited in claim 1, wherein the thermal barrier structure is integrally formed with at least one additional thermal barrier structure to establish a thermal barrier structure assembly.

13. A traction battery pack, comprising:
a battery array;
an enclosure assembly including a thermal barrier structure that is arranged to interface with the battery array; and
the thermal barrier structure including an interior wall that faces toward an interior of the enclosure assembly, an exterior wall that faces toward an exterior environment, and a sealed cavity disposed between the interior wall and the exterior wall,
wherein the interior wall and the exterior wall each include a dome-shaped surface.

14. The traction battery pack as recited in claim 13, wherein the thermal barrier structure includes a vacuum port.

15. The traction battery pack as recited in claim 14, wherein the vacuum port includes a getter.

16. The traction battery pack as recited in claim 14, wherein the vacuum port is provided on the dome-shaped surface of either the interior wall or the exterior wall.

* * * * *